US007613918B2

(12) United States Patent
Ben-Itzhak

(10) Patent No.: US 7,613,918 B2
(45) Date of Patent: *Nov. 3, 2009

(54) SYSTEM AND METHOD FOR ENFORCING A SECURITY CONTEXT ON A DOWNLOADABLE

(75) Inventor: Yuval Ben-Itzhak, Tel Aviv (IL)

(73) Assignee: Finjan Software Ltd., Netanya (IL)

( * ) Notice: Subject to any disclaimer, the term of this patent is extended or adjusted under 35 U.S.C. 154(b) by 441 days.

This patent is subject to a terminal disclaimer.

(21) Appl. No.: 11/354,893

(22) Filed: Feb. 16, 2006

(65) Prior Publication Data

US 2007/0192857 A1 Aug. 16, 2007

(51) Int. Cl.
*H04L 9/00* (2006.01)
*G06F 11/30* (2006.01)
*G08B 23/00* (2006.01)

(52) U.S. Cl. .................. 713/150; 713/151; 713/153; 713/180; 713/182; 713/188; 726/24

(58) Field of Classification Search .................. 713/150
See application file for complete search history.

(56) References Cited

U.S. PATENT DOCUMENTS

| 5,959,717 | A | | 9/1999 | Chaum | 352/40 |
|---|---|---|---|---|---|
| 5,974,549 | A | * | 10/1999 | Golan | 726/23 |
| 5,983,348 | A | * | 11/1999 | Ji | 726/13 |
| 6,018,374 | A | | 1/2000 | Wrobleski | 348/744 |
| 6,092,194 | A | | 7/2000 | Touboul | 726/24 |
| 6,118,487 | A | | 9/2000 | Hirtz et al. | 348/443 |
| 6,154,844 | A | * | 11/2000 | Touboul et al. | 726/24 |
| 6,167,520 | A | | 12/2000 | Touboul | 726/23 |
| 6,529,600 | B1 | | 3/2003 | Epstein et al. | 380/252 |
| 6,615,342 | B1 | | 9/2003 | Bopardikar et al. | 712/227 |
| 7,272,664 | B2 | | 9/2007 | Arimilli et al. | 709/250 |
| 2005/0198377 | A1 | * | 9/2005 | Ferguson et al. | 709/238 |
| 2007/0288729 | A1 | | 12/2007 | Erb | 712/234 |

FOREIGN PATENT DOCUMENTS

WO WO 9935583 A2 * 7/1999

OTHER PUBLICATIONS

Kalafut et al, A Study of Malware in Peer-to-Peer Networks, 2006, ACM, pp. 327-332.*

(Continued)

*Primary Examiner*—Christopher A Revak
*Assistant Examiner*—Aravind K Moorthy
(74) *Attorney, Agent, or Firm*—King & Spalding LLP

(57) ABSTRACT

A method for computer security, including receiving content including potentially malicious executable code ("CODE-A"), intended for downloading at a client computer, scanning CODE-A to derive a profile thereof, determining, based on the derived profile of CODE-A, an appropriate computer account from among a plurality of computer accounts, under which CODE-A may be processed by the client computer, wherein each computer account of the plurality of computer accounts has associated therewith a security context within which an executable run under such account is processed, combining (i) information about the determined computer account name and (ii) CODE-A, with executable wrapper code ("CODE-B") into combined code ("CODE-C"), and forwarding CODE-C to the client computer for processing. A system and a computer-readable storage medium are also described and claimed.

36 Claims, 5 Drawing Sheets

OTHER PUBLICATIONS

Ye et al, Trusted Paths for Browsers, 2005, ACM, pp. 153-186.*
Zhang et al, An Approach to Detect Executable Content for Anomaly Based Network Intrusion Detection, 2007, IEEE, pp. 1-8.*
Park et al, Component integrity check and recovery against malicious codes, 2006, IEEE, pp. 1-5.*
Written Opinion for Application No. PCT/IB07/02108, dated May 5, 2008, 6 pp.
International Search Report for Application No. PCT/IB07/02108, dated May 5, 2008, 2 pp.

* cited by examiner

SYSTEM AND METHOD FOR ENFORCING A SECURITY CONTEXT ON A DOWNLOADABLE

FIELD OF THE INVENTION

The present invention relates to computer security, and more particularly to protection against malicious content.

BACKGROUND OF THE INVENTION

Malicious computer content has been rampant for over two decades now. Malicious content generally comes in the form of executable code that performs adverse operations, such as modifying a computer's operating system or file system, damaging a computer's hardware or hardware interfaces, or automatically transmitting data from one computer to another. Generally, malicious content is generated by hackers willfully, in order to exploit computer vulnerabilities. However, malicious content can also arise by accident, due to bugs in software applications.

Generally malicious content is transmitted as executable code inserted into files or into web pages. Originally, as each new malicious content was discovered, a signature of the content was collected by computer security companies and used from then on to detect the malicious content and protect computers against it. Users would routinely scan their file systems using computer security software, which regularly updated its signature database as new malicious content was discovered.

Such signature-based protection is referred to as "reactive", since it can only protect in reaction to malicious content that has already been discovered.

Two generic types of computer security applications that are currently available to protect against malicious content are (i) gateway security applications, and (ii) desktop security applications. Gateway security applications shield against malicious content before the content is delivered to its intended destination client computer. Gateway security applications scan content, and block the content from reaching the destination client computer if the content is deemed by the security application to be potentially malicious.

In distinction, desktop security applications are local applications that shield against malicious content after the content reaches its intended destination client computer. Desktop security applications may use conventional reactive protection to scan incoming content for the present of known signatures. Desktop security applications may also monitor content during run-time by monitoring requests made to an operating system, as described hereinbelow.

In addition to reactive security applications, which are based on databases of known malicious content signatures, recently "proactive" security applications have been developed. Proactive protection uses a methodology known as "behavioral analysis" to analyze computer content for the presence of malicious content. Behavior analysis is used to automatically scan and parse executable content, in order to detect which computer operations the content may perform. As such, behavioral analysis can block unknown malicious content that has not been previously detected and which does not have a signature on record, hence the name "proactive".

Assignee's U.S. Pat. No. 6,092,194 entitled SYSTEM AND METHOD FOR PROTECTING A COMPUTER AND A NETWORK FROM HOSTILE DOWNLOADABLES, the contents of which are hereby incorporated by reference, describes gateway level behavioral analysis. Such behavioral analysis scans and parses content received at a gateway and generates a security profile for the content. A security profile is a general list or delineation of suspicious, or potentially malicious, operations that executable content may perform. The derived security profile is then compared against a security policy for the computer being protected, to determine whether or not the content's security profile violates the computer's security policy. A security policy is a general set of simple or complex rules, that may be applied logically in series or in parallel, which determine whether or not a specific operation is permitted or forbidden to be performed by the content on the computer being protected. Security policies are generally configurable, and set by an administrator of the computers that are being protected.

Assignee's U.S. Pat. No. 6,167,520 entitled SYSTEM AND METHOD FOR PROTECTING A CLIENT DURING RUNTIME FROM HOSTILE DOWNLOADABLES, the contents of which are hereby incorporated by reference, describes desktop level behavioral analysis. Desktop level behavioral analysis is generally implemented during runtime, while executable content is running on a client desktop computer. As the content is being processed, desktop security applications monitor calls made to critical systems of the client computer, such as the operating system, the file system and the network system. Desktop security applications use hooks to intercept calls made to operating system functions. Based on a predefined security policy, behavioral-based desktop security applications allow or block an operating system call made by content during run-time, depending on whether or not the call violates the security policy. Calls to WriteFile( ) and DeleteFile( ), for example, may violate the security policy, and thus be blocked.

Each of the various computer protection technologies, gateway vs. desktop, reactive vs. proactive, has its pros and cons. Reactive protection is computationally simple and fast; proactive protection is computationally intensive and slower. Reactive protection cannot protect against new "first-time" malicious content, and cannot protect a user if his signature file is out of date; proactive protection can protect against new "first-time" malicious content and do not require regular downloading of updated signature files. Gateway level protection keeps malicious content at a greater distance from a local network of computers. Desktop level protection is more accurate, since it runs on the same computer as the suspicious content. Desktop level protection is risky in that if a malicious request is missed, due to incomplete functionality or due to a software bug in the protection system, the consequences may be severe since the malicious content is already running on the client desktop computer. Desktop level protection is generally available in the consumer market for hackers to obtain, and is susceptible to reverse engineering; gateway level protection is not generally available to hackers.

Reference is now made to FIG. 1, which is a simplified block diagram of prior art systems for blocking malicious content, as described hereinabove. The topmost system shown in FIG. 1 illustrates a gateway level security application. The middle system shown in FIG. 1 illustrates a desktop level security application, and the bottom system shown in FIG. 1 illustrates a combined gateway+desktop level security application.

The topmost system shown in FIG. 1 includes a gateway computer 105 that receives content from the Internet, the content intended for delivery to a client computer 110. Gateway computer 105 receives the content over a communication channel 120, and gateway computer 105 communicates with client computer 110 over a communication channel 125. Gateway computer 105 includes a gateway receiver 135 and a gateway transmitter 140. Client computer 110 includes a client receiver 145. Client computer 110 generally also has a client transmitter, which is not shown.

Client computer 110 includes a content processor 170, such as a conventional CPU, which processes content and typically renders it for interactive viewing on a display monitor. Such content may be in the form of executable code, JavaScript, VBScript, PerScript, Java applets and ActiveX controls.

Gateway computer 105 includes a content inspector 174 which may be reactive or proactive, or a combination of reactive and proactive. Incoming content is analyzed by content inspector 174 before being transmitted to client computer 110. If incoming content is deemed to be malicious, then gateway computer 105 preferably prevents the content from reaching client computer 110. Alternatively, gateway computer 105 may modify the content so as to render it harmless, and subsequently transmit the modified content to client computer 110.

Content inspector 174 can be used to inspect incoming content, on its way to client computer 110 as its destination, and also to inspect outgoing content, being sent from client computer 110 as its origin.

The middle system shown in FIG. 1 includes a gateway computer 105 and a client computer 110, the client computer 110 including a content inspector 176. Content inspector 176 may be a conventional signature-based security application, or a run-time behavioral based application that monitors run-time calls invoked by executing content to operating system, file system and network system functions.

The bottom system shown in FIG. 1 includes both a content inspector 174 at gateway computer 105, and a content inspector 176 at client computer 110. Such a system can support conventional gateway level protection, desktop level protection, reactive protection and proactive protection.

A drawback of the systems shown in FIG. 1 is that content inspector 174 is unable to inspect content that is illegible; such as encrypted content, scrambled content or compressed content. Both signature based security and behavior-based security methods cannot be applied to illegible content. When such content is received, inspector 174 either blocks the content, which may in fact be harmless, or allows the content, which may in fact be malicious. Blocking of harmless content defeats productivity, and allowing of malicious content may lead to severe damage.

Conventional digital rights management systems generally secure content by making it illegible, and such content generally cannot be scanned by inspector 174, unless the content's license restrictions or authentication logic are defeated. Thus it may be appreciated by those skilled in the art that digital rights management relies on technology that inherently prevents gateway security software from being able to inspect content. For example, malicious content, such as malicious music files and video files, may be processed by a digital rights management application, and pass through a gateway screening undetected.

Therefore there is a need for security applications that are able to protect against illegible content, such as content protected by digital rights management, that is generally, encrypted, scrambled or compressed.

SUMMARY OF THE DESCRIPTION

The present invention concerns systems and methods for protecting client computers against illegible content, such as encrypted, scrambled or compressed content. As such, the present invention also complements digital rights management applications by providing protection against malicious content that includes digital rights management therewithin.

The present invention makes use of restricted security contexts that are associated within certain user/group computer accounts, such as guest accounts. Specifically, the present invention ensures that suspicious content is processed within a restricted security context on a client computer, by running such content under an appropriate user/group computer account.

There is thus provided in accordance with a preferred embodiment of the present invention a method for computer security, including receiving content including potentially malicious executable code ("CODE-A"), intended for downloading at a client computer, scanning CODE-A to derive a profile thereof, determining, based on the derived profile of CODE-A, an appropriate computer account from among a plurality of computer accounts, under which CODE-A may be processed by the client computer, wherein each computer account of the plurality of computer accounts has associated therewith a security context within which an executable run under such account is processed, combining (i) information about the determined computer account name and (ii) CODE-A, with (iii) executable wrapper code ("CODE-B") into combined code ("CODE-C"), and forwarding CODE-C to the client computer for processing.

There is further provided in accordance with a preferred embodiment of the present invention a computer security system for a gateway computer, including a receiver for receiving content including potentially malicious executable code ("CODE-A"), intended for downloading at a client computer, a code profiler, coupled with the receiver, for scanning CODE-A and deriving a profile thereof, a security context generator, coupled with the code profiler, for determining, based on the profile of CODE-A derived by the profiler, an appropriate computer account from among a plurality of computer accounts, under which CODE-A may be processed by the client computer, wherein each computer account of the plurality of computer accounts has associated therewith a security context within which an executable run under such account is processed, a code packager, coupled with the security context generator, for packaging (i) information about the computer account determined by said security context generator and (ii) CODE-A, with (iii) executable wrapper code ("CODE-B"), into a combined code ("CODE-C"), and a transmitter, coupled with the code packager, for forwarding CODE-C to the client computer for processing.

There is yet further provided in accordance with a preferred embodiment of the present invention a computer-readable storage medium storing program code for causing at least one computing device to receive content including potentially malicious executable code ("CODE-A"), intended for downloading at a client computer, scan CODE-A to derive a profile thereof, determine, based on the derived profile of CODE-A, an appropriate computer account from among a plurality of computer accounts, under which CODE-A may be processed by the client computer, wherein each computer account of the plurality of computer accounts has associated therewith a security context within which an executable is processed, combine (i) information about the determined computer account name and (ii) CODE-A, with (iii) executable wrapper code ("CODE-B") into combined code ("CODE-C"), and forward CODE-C to the client computer for processing.

There is moreover provided in accordance with a preferred embodiment of the present invention a method for computer security, including downloading, by a computer, executable code ("CODE-C"), where CODE-C includes (i) wrapper executable code ("CODE-B"), (ii) potentially malicious executable code ("CODE-A"), and (iii) information about a computer account for CODE-A, and processing, by the computer, CODE-B, including extracting CODE-A from within CODE-C, extracting the information about the computer account for CODE-A from within CODE-C, and processing CODE-A within a security context associated with the computer account for CODE-A.

There is additionally provided in accordance with a preferred embodiment of the present invention a computer security system including a receiver within a computer, for downloading executable code ("CODE-C"), where CODE-C includes (i) wrapper executable code ("CODE-B"), (ii) potentially malicious executable code ("CODE-A"), and (iii) information about a computer account for CODE-A, a code extractor within the computer, coupled with the receiver, for extracting CODE-A from within CODE-C, a computer account extractor within the computer, coupled with the receiver, for extracting the information about the computer account name for CODE-A from within CODE-C, and a processor within the computer, coupled with the code extractor and the computer account extractor, for processing CODE-A within a security context associated with the computer account for CODE-A.

There is further provided in accordance with a preferred embodiment of the present invention a computer-readable storage medium storing program code for causing at least one computing device to download executable code ("CODE-C"), where CODE-C includes (i) wrapper executable code ("CODE-B"), (ii) potentially malicious executable code ("CODE-A"), and (iii) information about a computer account for CODE-A, and process CODE-A, including extracting CODE-A from within CODE-C, extracting the information about the computer account name for CODE-A from within CODE-C, and processing CODE-A within a security context associated with the computer account for CODE-A.

There is yet further provided in accordance with a preferred embodiment of the present invention a method for computer security, including receiving content including potentially malicious executable code ("CODE-A"), intended for downloading at a client computer, receiving a predetermined computer account name that has associated therewith a security context within which an executable run under such account is processed, scanning CODE-A to derive a profile thereof, combining (i) information about the determined computer account name and (ii) CODE-A, with (iii) executable wrapper code ("CODE-B") into combined code ("CODE-C"), and forwarding CODE-C to the client computer for processing.

There is additionally provided in accordance with a preferred embodiment of the present invention a computer security system for a gateway computer, including a receiver for receiving content including potentially malicious executable code ("CODE-A"), intended for downloading at a client computer, a code profiler, coupled with the receiver, for scanning CODE-A and deriving a profile thereof, and a code packager, coupled with the security context generator, for packaging (i) information about a predetermined computer account, the computer account having associated therewith a security context within which an executable run under such account is processed, and (ii) CODE-A, with (iii) executable wrapper code ("CODE-B"), into a combined code ("CODE-C"), and a transmitter, coupled with the code packager, for forwarding CODE-C to the client computer for processing.

There is moreover provided in accordance with a preferred embodiment of the present invention a computer-readable storage medium storing program code for causing at least one computing device to receive content including potentially malicious executable code ("CODE-A"), intended for downloading at a client computer, receive a predetermined computer account name that has associated therewith a security context within which an executable run under such account is processed, scan CODE-A to derive a profile thereof, combine (i) information about the determined computer account name and (ii) CODE-A, with (iii) executable wrapper code ("CODE-B") into combined code ("CODE-C"); and forward CODE-C to the client computer for processing.

The following definitions are employed throughout the specification and claims.

COMPUTER ACCOUNT NAME—a description of a user or group computer account with sufficient detail to initiate a new process. A computer account name may include a username, a password, a domain name, or such other attribute necessary to initiate the new process.

PROFILE—a list or delineation of one or more attributes of executable content including the source from which the content originated, the time & date at which the content was received, the destination client computer to which the content is being sent, and privileges of a user of the destination client computer. A profile may also include a list or delineation of potentially malicious operations that the content is programmed to perform.

SECURITY CONTEXT—an environment in which a software application is run, which may limit resources that the application is permitted to access or operations that the application is permitted to perform.

BRIEF DESCRIPTION OF THE DRAWINGS

The present invention will be more fully understood and appreciated from the following detailed description, taken in conjunction with the drawings in which.

DETAILED DESCRIPTION

The present invention concerns systems and methods for protecting computers against malicious content, by ensuring that potentially malicious content runs in a limited security context. Malicious content may arrive within a web page via HTTP, or within a file via FTP, or via such other conventional transfer protocol. Generally, operating systems run processes under different user/group computer account names, each account name having a different security context associated therewith. Thus a process may run in a security context of "Administrator" and have many privileges in the system, or in a security context of "Guest" and have limited privileges on the system. Operating systems use security contexts to manage and control the privileges that processes have in the systems.

The present invention uses user/group computer account names to control the security contexts in which content downloaded over the Internet is run on a client computer. For example, if content received over the Internet originated from an external un-trusted network, the security context in which it is executed on the client computer has limited privileges. If content is received from a trusted network or a trusted source, then the security context in which it is executed may have normal privileges. "Normal" privileges generally correspond to privileges of a current logged-in user who initiates execution of the content.

Figure 1:
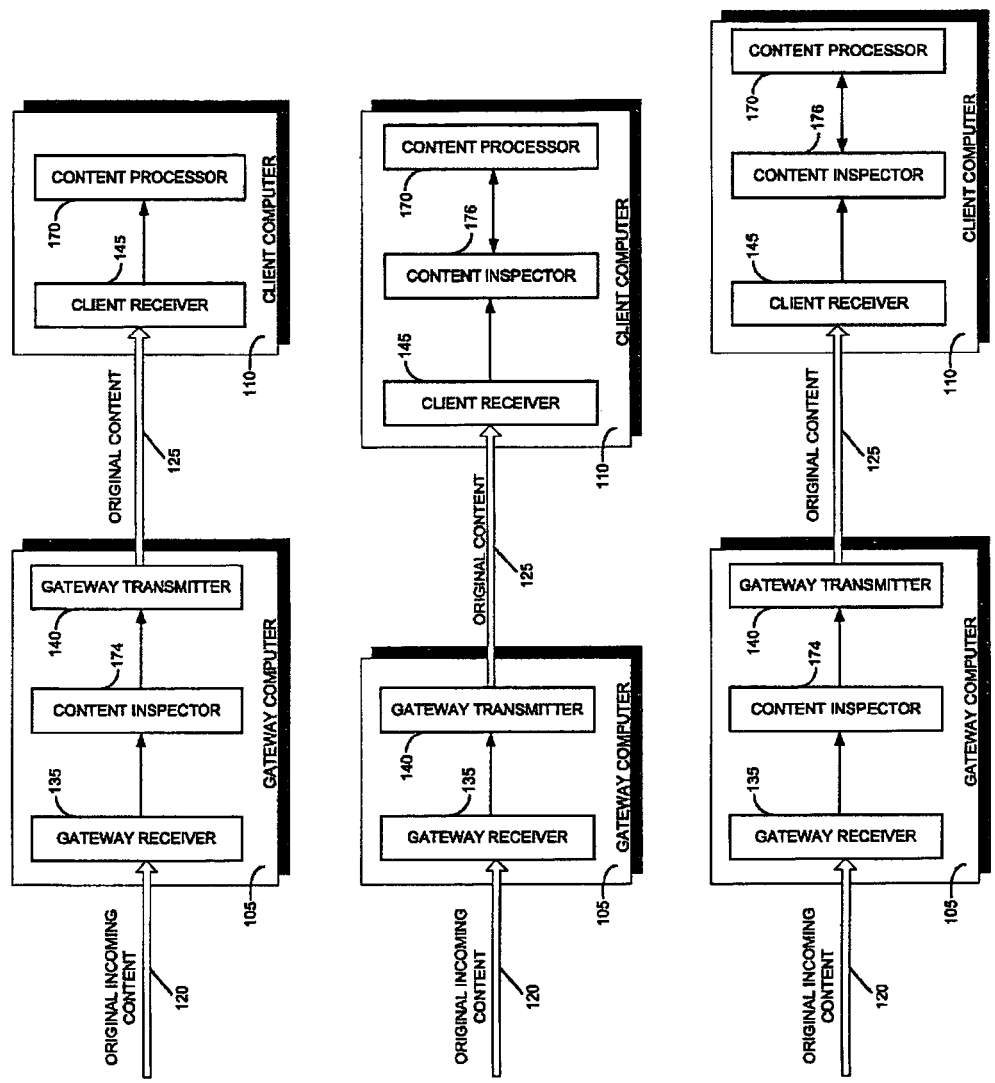
FIG. 1 is a simplified block diagram of prior art systems for blocking malicious content.
Figures 2, 3:
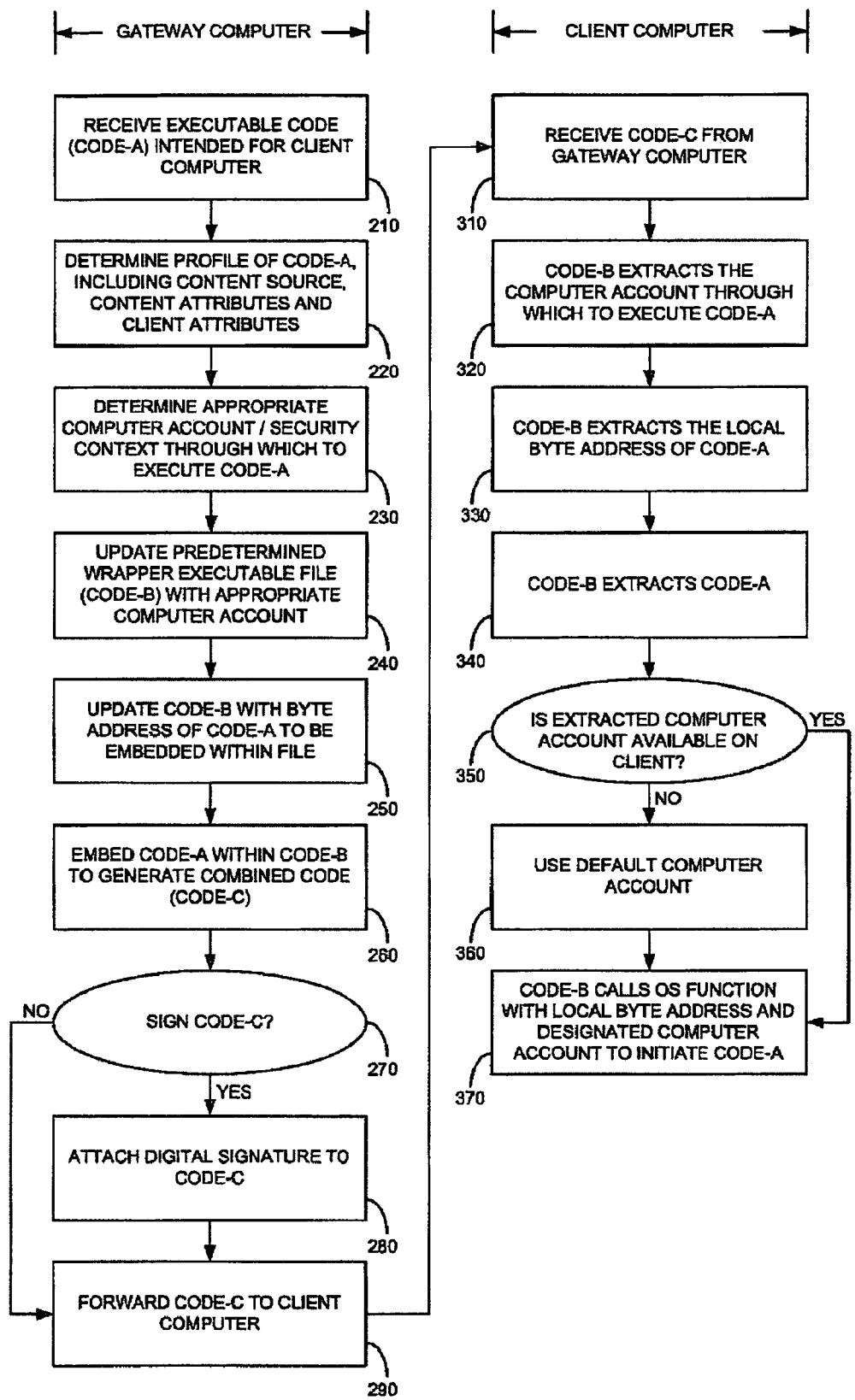
FIG. 2 is a simplified flowchart of a method for wrapping executable code within a safe portable executable file at a gateway computer, for delivery to a client computer, in accordance with a preferred embodiment of the present invention.
FIG. 3 is a simplified flowchart of a method for executing the safe portable executable at a client computer, in accordance with a preferred embodiment of the present invention.

Reference is now made to FIG. 2, which is a simplified flowchart of a method for wrapping executable code within a safe portable executable file at a gateway computer, for delivery to a client computer, in accordance with a preferred embodiment of the present invention. At step 210 the gateway computer receives content, designated as CODE-A, from a network such as the Internet, intended for a client computer. The received content, CODE-A, may be an HTML page, an XML document, an ActiveX object, a Java applet, a VBScript, a PerScript, a standalone executable, or such other content that is generally distributed over networks. The content may be delivered via HTTP within a web page, or via FTP as a standalone file, or via such other conventional transfer protocol.

Preferably, the gateway computer detects the type of content it receives by using a true-type detection method. If the content is determined to be executable, then at step 220 the gateway computer determines a profile of CODE-A, including inter alia the following attributes: source location from which the content was received, date & time the content was received, client address and client authorization. At step 220, the gateway computer may optionally use a set of logical rules to resolve values of attributes. For example, resolution of an attribute may depend on values of other attributes.

At step 230 the gateway computer determines an appropriate user/group computer account name through which to execute CODE-A on the client computer, from among a plurality of stored user/group computer account names. Each user/group computer account name is associated with a security context, and gateway computer 230 preferably determines the appropriate user/group computer account name based at least in part on the profile determined at step 220. As described hereinbelow, the present invention ensures that the user/group computer account determined at step 230 is the account used on the client computer to execute CODE-A.

Databases with a plurality of stored user/group computer account names are available at centralized directories, such as Microsoft's Active Directory. The Active Directory service provides information about networked devices and services and the users who use them.

At step 240 the gateway computer prepares a predetermined wrapper executable file, designated CODE-B, which is used to wrap CODE-A therewithin. Specifically, at step 240 the gateway computer inserts the user/group computer account name determined at step 230 into CODE-B. CODE-B is preferably a standalone executable file, which includes appropriate computer instructions to initiate a new process using a specified user/group computer account name. In a preferred embodiment of the present invention, CODE-B uses the Microsoft Windows CreateProcessAsUser( ) function, which accepts as input a specified user/group computer account name, and produces as output a process that runs under the specified user/group computer account.

At step 250 the gateway computer inserts a byte address that corresponds to the location at which CODE-A is to be inserted within the file for CODE-B. The gateway computer may insert additional attributes into CODE-B, as described hereinbelow with respect to FIG. 7. At step 260 the gateway computer embeds CODE-A within CODE-B at the location indicated by the byte address inserted at step 250, thus generating a combined file, designated as CODE-C. Generally, the data and code inserted at steps 230, 240 and 250 is inserted at the end of CODE-B.

At step 270 the gateway computer determines whether or not CODE-C should be digitally signed. Generally, the decision whether or not to attach a digital signature to CODE-C is made by a system administrator. If the determination is affirmative, then at step 280 the gateway computer preferably attaches a conventional digital signature to CODE-C, such as Microsoft Authenticode. As will be appreciated by those skilled in the art, file signing uses a trusted and valid certificate to digitally sign CODE-C for subsequent validation by the client computer.

Finally, at step 290 the gateway computer forwards CODE-C to the intended client computer recipient.

Reference is now made to FIG. 3, which is a simplified flowchart of a method for executing the safe portable executable at a client computer, in accordance with a preferred embodiment of the present invention. At step 310, the client computer receives the embedded executable file, CODE-C, from the gateway computer. The structure of CODE-C is such that when the client computer launches CODE-C, the wrapper code, CODE-B, begins to execute. At step 320 CODE-B extracts the user/group computer account name that was inserted into CODE-B at step 230. At step 330, CODE-B extracts the local byte address of CODE-A that was inserted into CODE-B at step 240. At step 340, CODE-B locates CODE-A using the byte address extracted at step 330, and extracts CODE-A that was inserted into CODE-B at step 260.

At step 350 the client computer determines whether or not the user/group computer account extracted at step 320 exists. It will be appreciated by those skilled in the art that conventional operating systems enable querying of a directory for the existence of a specific user/group account name. If it is determined that the user/group computer account does not exist, then the client computer uses a default user/group computer account at step 360. The default user/group computer account is preferably set by a system administrator. The default user/group computer account may be that of a "guest" user, or the normal account of the logged-in user. Otherwise, if it is determined at step 350 that the user/group computer account name extracted at step 320 does exist, then the client computer uses the user/group account from step 320.

Finally, at step 370 CODE-B calls an operating system function with the byte address determined at step 340 and the selected user/group computer account, and initiates execution of CODE-A. In a preferred embodiment of the present invention, the Windows function CreateProcessAsUser( ) is used for this purpose. CODE-A then begins running within the security context corresponding to the selected user/group computer account.

In a preferred embodiment of the present invention, CODE-B monitors CODE-A to detect if CODE-A creates, extracts or initiates another executable code, designated as CODE-D. If so, then CODE-D is inserted into CODE-B for ensuring a protected launch.

Figure 4:
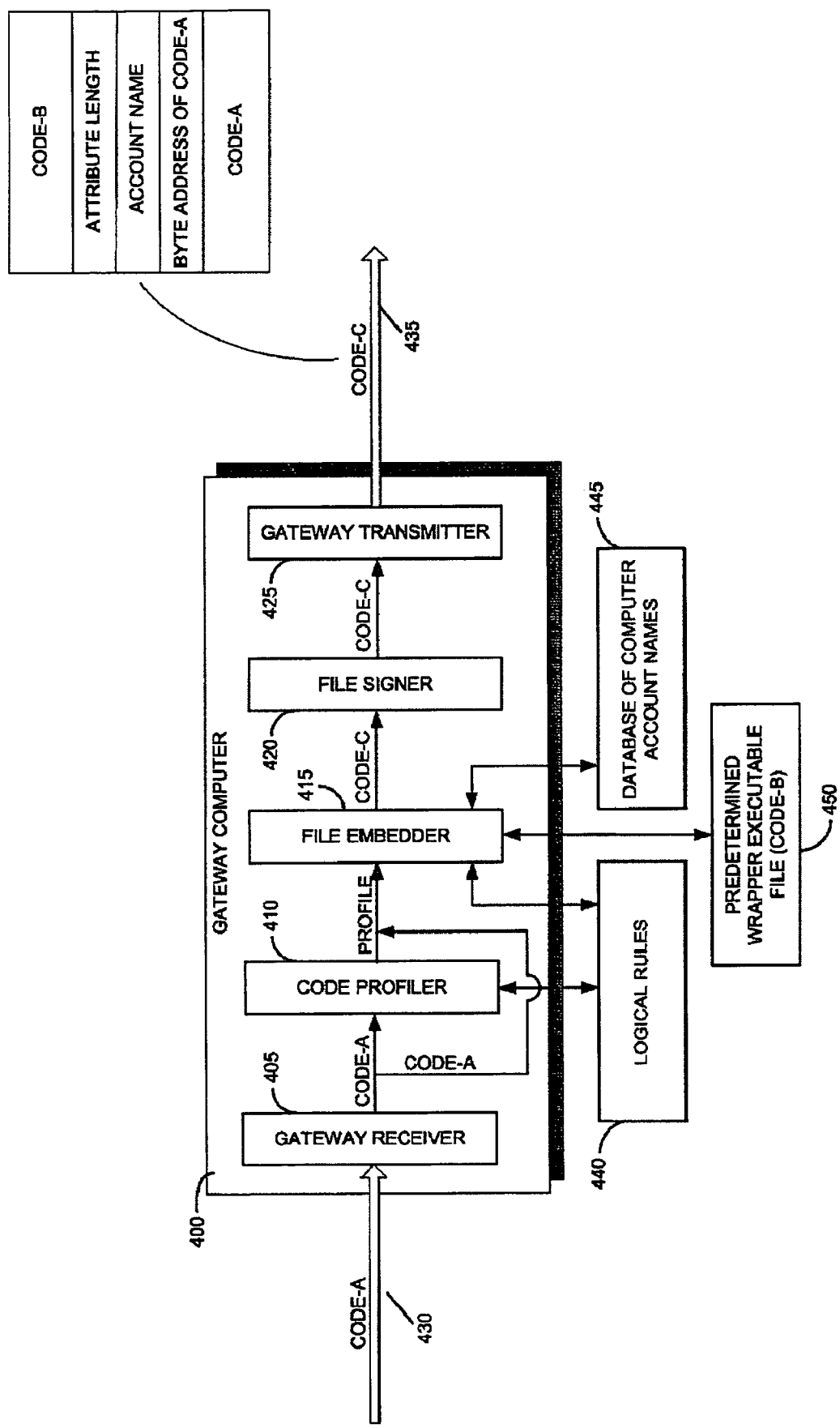
FIG. 4 is a simplified block diagram of a gateway computer system for wrapping executable code within a safe portable executable file, in accordance with a preferred embodiment of the present invention.

Reference is now made to FIG. 4, which is a simplified block diagram of a gateway computer system for wrapping executable code within a safe portable executable file, in accordance with a preferred embodiment of the present invention. Shown in FIG. 4 is a gateway computer 400 with five modules serially arranged. A gateway receiver 405 receives content, CODE-A, over a communication channel 430 from a network such as the Internet. CODE-A is intended for delivery to a destination client computer serviced by gateway computer 400. Generally, CODE-A is sent to the destination client computer in response to a request from the client computer, such as an HTTP request or an FTP request or such other conventional transfer protocol request. CODE-A may be an HTML page, an XML document, an ActiveX object, a Java applet, a VBScript, a PerScript, a standalone executable, or other such content that is conventionally transmitted over networks.

Preferably, gateway computer 400 uses a true-type detection method to identify the type of content within CODE-A. If gateway computer 400 determines that CODE-A includes executable content, it forwards CODE-A to a code profiler 410, which scans CODE-A and identifies attributes thereof, including inter alia the source from where the content originated, the data & time the content was received, the requesting client address and the requesting client authorization. Optionally, content profiler 410 may use a set of logical rules 440 to resolve values of one or more attributes.

A file embedder 415 receives the content profile derived by code profiler 410, and CODE-A, and determines an appropriate user/group computer account name through which to execute CODE-A on the destination client computer, from among a plurality of user/group computer account names. Each user/group computer account is associated with a specific security context, which restricts running processes from performing potentially malicious operations. File embedder 415 may use the set of logical rules 440 to determine the appropriate user/group computer account name, based on the content profile derived by code profiler 410. Logical rules 440 may determine inter alia an appropriate security context based on potentially malicious computer operations identified within CODE-A by code profiler 410.

As shown in FIG. 4, file embedder 415 preferably has access to a database 445 of computer account names. Database 445 can be populated by an administrator, manually or semi-automatically or fully automatically. In addition database 445 can be imported from or linked to a centralized user/group account directory, such as Microsoft's Active Directory. Active Directory service provides a central location to store information in a distributed environment about networked devices, services and users.

File embedder 415 preferably uses a predetermined wrapper file 450, CODE-B, within which to embed CODE-A. In a preferred embodiment of the present invention, CODE-B has the structure of a portable executable files is described in detail hereinbelow with respect to FIG. 7. Preferably CODE-B includes instructions for a function to initiate a new process using a specified user/group account name, such as the Microsoft Windows CreateProcessAsUser( ) function.

File embedder 415 inserts the appropriate user/group account name described hereinabove into CODE-B. Preferably, file embedder 415 also inserts a length of the user/group account name into CODE-B in front of the account name, so that subsequently a precise fetch of the account name can be made directly.

File embedder 415 preferably inserts an address of the location within CODE-B where CODE-A is to be embedded. Such address generally includes a byte offset from the beginning of the file. After inserting the address, file embedder 415 then inserts CODE-A into CODE-B, following the account name+address, beginning at the location at the specified address. Generally, the length, the account name, the address and CODE-A are inserted at the end of CODE-B.

After embedding CODE-A within CODE-B, the combined file, CODE-C, is forwarded to a file signer 420 for digital signing by a method such as the Microsoft Authenticode signing. File signer 420 preferably uses a trusted and valid certificate to digitally sign CODE-C, for subsequent validation by the client computer.

After file signer 420 signs CODE-C, a gateway transmitter 425 sends CODE-C over a communication channel 430, to the client computer destination.

It will be appreciated by those skilled in the art that components 440, 445 and 450 may reside within gateway computer 400, or be accessible to gateway computer 400 from one or more other computers.

Figure 5:
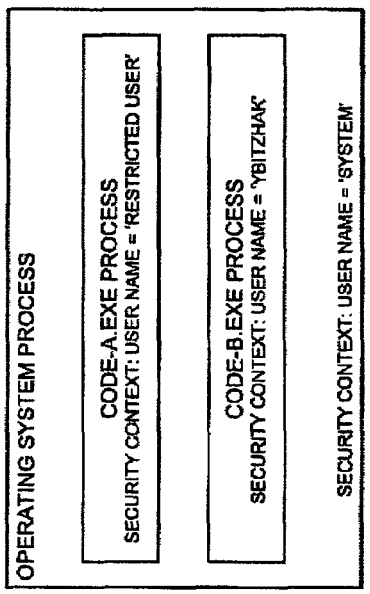
FIG. 5 is a simplified illustration of executable codes running in different security contexts on a client computer, in accordance with a preferred embodiment of the present invention.
Figure 6:
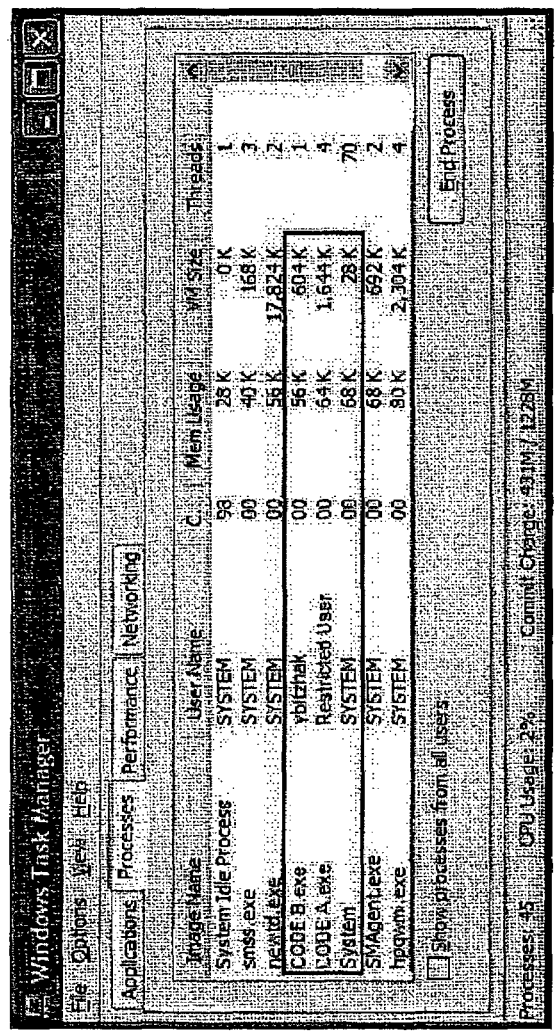
FIG. 6 is a screen shot of a Windows Task Manager identifying the three processes of FIG. 5, in accordance with a preferred embodiment of the present invention.

Reference is now made to FIG. 5, which is a simplified illustration of executable codes running in different security contexts on a client computer, in accordance with a preferred embodiment of the present invention. Reference is also made to FIG. 6, which is a screen shot of a Windows Task Manager identifying the three processes of FIG. 5, in accordance with a preferred embodiment of the present invention. The operating system process is the main process of the client computer, and the Task Manager indicates that this process runs in a security context of a user name "SYSTEM", it being understood that different operating systems may use different user account names for the operating system process. When CODE-C is launched on the client computer at step 310, CODE-B is initiated in a security context of a logged-in user. Specifically, as shown in FIG. 5, CODE-B runs within the security context of a logged-in user with username "ybitzhak". After initiating CODE-A at step 370, CODE-A runs within the security context of a username "restricted user", which is the account name extracted at step 320, and corresponds to a restricted security context.

Figure 7:
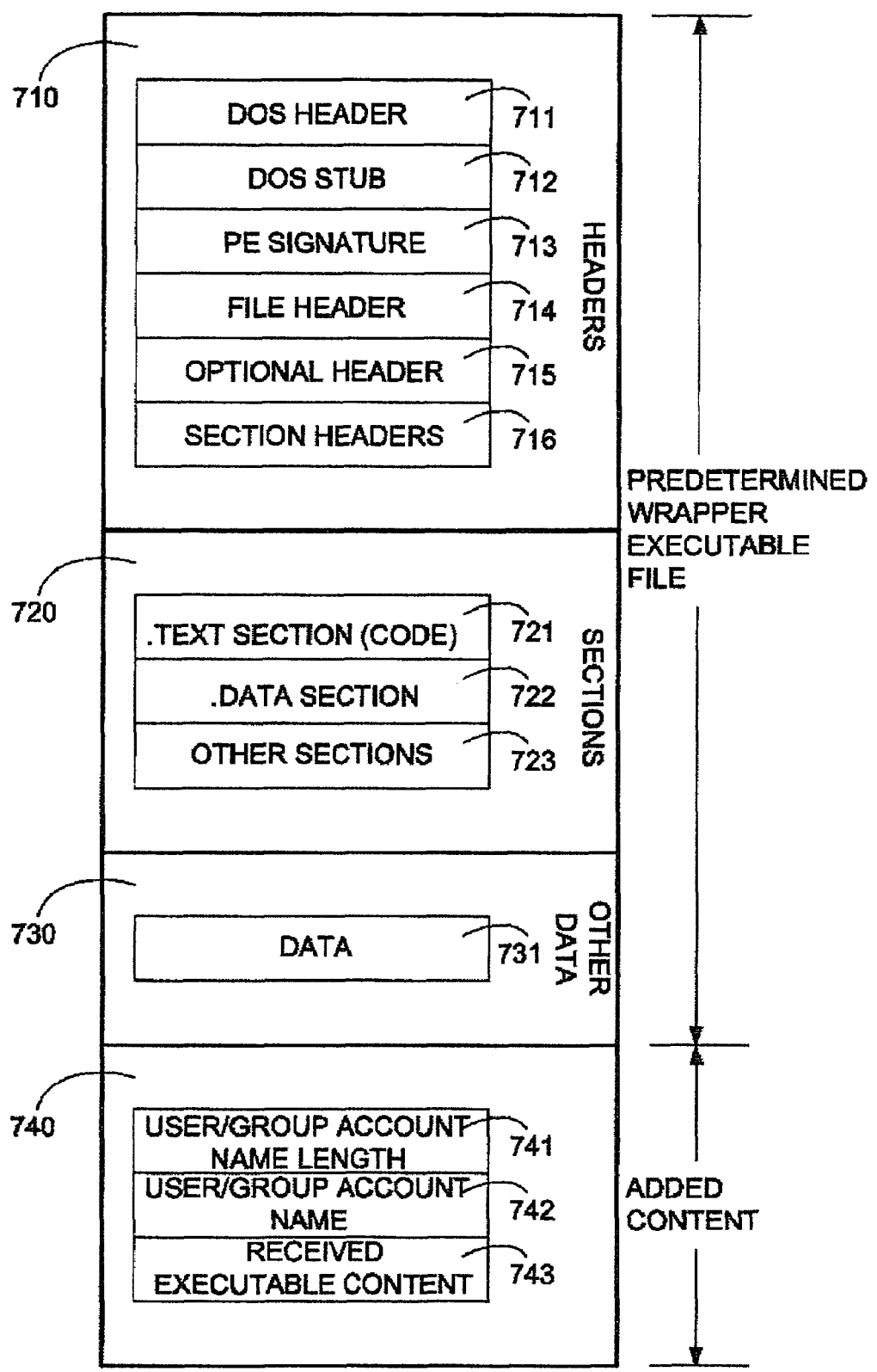
FIG. 7 is a simplified illustration of the structure of a portable executable file, modified in accordance with a preferred embodiment of the present invention.

Reference is now made to FIG. 7, which is a simplified illustration of the structure of a portable executable (PE) file, modified in accordance with a preferred embodiment of the present invention. Preferably, the wrapper CODE-B described hereinabove is formatted as a WIN32 portable executable file. A WIN32 portable executable file has a standard file structure, which can be read by an operating system. The file structure allows for appending content at the end of the file, as shown in FIG. 7, such appended content including inter alia a specified user/group computer account name and executable code. A detailed description of portable executable files is available at Microsoft's Developer Network, which teaches that "When PE files are loaded into memory via the Windows loader, the in-memory version is known as a module . . . A module in memory represents all the code, data and resources from an executable file that is needed by a process. Other parts of a PE file may be read, but not mapped in (for instance, relocations). Some parts may not be mapped in at all, for example, when debug information is placed at the end of the file. A field in the PE header tells the system how much memory needs to be set aside for mapping the executable into memory. Data that won't be mapped in is placed at the end of the file, past any parts that will be mapped in."

As shown in FIG. 7, a PE file includes three standard blocks: a headers block 710, a sections block 720 and an other data block 730. Headers block 710 includes inter alia a DOS header 711, a DOS stub 712, a PE signature 713, a file header 714, an optional header 715 and one or more section headers 716. Sections block 720 includes inter alia a text section 721, a data section 722 and one or more other sections 723. Other data block 730 includes inter alia data 731.

In addition to the three standard blocks, the PE file structure shown in FIG. 7 also includes a block 740 for added content, which is used in the present invention for including a specified user/group account name length 741, a user/group computer account name 742, and executable content 743; namely, CODE-A.

It may thus be appreciated that the present invention enables execution of content, including digital rights managed content, on client computers while enforcing a secure execution context. The present invention has several advantages, including inter alia:

The present invention is a vital complement to digital rights management applications, since it protects against malicious content that includes digital rights management therewithin.

The present invention does not require installation of security software on a client computer.

The present invention can be managed by a system administrator, who controls the security context in which an executable is run, based on factors including inter alia the source of the executable, and the privileges of the user who requested the executable, and based on a configurable security policy.

The present invention can be used to maintain a log of suspicious content received, and to issue reports of same to a system administrator.

The present invention is simple and efficient.

In reading the above description, persons skilled in the art will realize that there are many apparent variations that can be applied to the methods and systems described. Thus it may be appreciated that the present invention applies to a variety of computing devices, including mobile devices with wireless Internet connections such as laptops, PDAS, iPods, MP3 players, and cell phones. The present invention protects against malicious content that may be embedded within a wide variety of media types such as documents, music, video, images, animations and presentations.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for computer security, comprising:
receiving content including potentially malicious executable code ("CODE-A"), intended for downloading at a client computer, wherein the client computer manages a plurality of computer accounts for logging in to the client computer, and wherein each computer account of the plurality of computer accounts has associated therewith a security context within which an executable running on the client computer under such account is processed;
scanning CODE-A to derive a profile thereof;
determining, based on the derived profile of CODE-A, an appropriate computer account from among the plurality of computer accounts, under which CODE-A may be processed by the client computer;
combining (i) information about the determined computer account name and (ii) CODE-A, with (iii) executable wrapper code ("CODE-B") into combined code ("CODE-C"); and
forwarding CODE-C to the client computer for processing.

2. The method of claim 1 further comprising attaching a digital signature to CODE-C.

3. The method of claim 1 wherein said determining is also based on at least one security rule applicable to the client computer.

4. The method of claim 1 wherein said determining comprises:
identifying an appropriate security context; and
identifying an appropriate computer account corresponding to the identified security context.

5. The method of claim 1 wherein said determining accesses the plurality of computer accounts from a database of computer accounts.

6. The method of claim 1 wherein said determining accesses the plurality of computer accounts from a Microsoft Active Directory of computer accounts.

7. The method of claim 1 wherein said determining checks if the appropriate computer account exists on the client computer.

8. The method of claim 7 wherein said determining replaces the appropriate computer account with a default computer account if the appropriate computer account does not exist on the client computer.

9. The method of claim 1 wherein CODE-A is a member of the group consisting of JavaScript, VBScript, PerScript, Java applet, Active X, and a standalone executable.

10. The method of claim 1 wherein CODE-B is a Windows Portable Executable.

11. The method of claim 1 further comprising maintaining an activity log including an entry for each combined CODE-C generated by said combining.

12. A computer security system for a gateway computer, comprising:
a receiver for receiving content including potentially malicious executable code ("CODE-A"), intended for downloading at a client computer, wherein the client computer manages a plurality of computer accounts for logging in to the client computer, and wherein each computer account of the plurality of computer accounts has associated therewith a security context within which an executable running on the client computer under such account is processed;
a code profiler, coupled with said receiver, for scanning CODE-A and deriving a profile thereof;
a security context generator, coupled with said code profiler, for determining, based on the profile of CODE-A derived by said profiler, an appropriate computer account from among the plurality of computer accounts, under which CODE-A may be processed by the client computer;
a code packager, coupled with said security context generator, for packaging (i) information about the computer account determined by said security context generator and (ii) CODE-A, with (iii) executable wrapper code ("CODE-B"), into a combined code ("CODE-C"); and
a transmitter, coupled with said code packager, for forwarding CODE-C to the client computer for processing.

13. The computer security system of claim 12 further comprising a digital authenticator for attaching a digital signature to CODE-C.

14. The computer security system of claim 12 wherein said security context generator also bases its determination on at least one security rule applicable to the client computer.

15. The computer security system of claim 12 wherein said security context generator first identifies an appropriate security context, and then identifies an appropriate computer account for the identified security context.

16. The computer security system of claim 12 further comprising a database for storing information about the plurality of computer accounts accessed by said context security generator.

17. The computer security system of claim 12 wherein said context security generator accesses information about the plurality of computer accounts from a Microsoft Active Directory of computer accounts.

18. The computer security system of claim 12 wherein CODE-A is a member of the group consisting of JavaScript, VBScript, PerScript, Java applet, Active X, and a standalone executable.

19. The computer security system of claim 12 wherein CODE-B is a Windows Portable Executable.

20. The computer security system of claim 12 further comprising a log manager for maintaining an activity log including an entry for each combined CODE-C generated by said code packager.

21. A computer-readable storage medium storing program code for causing at least one computing device to:
 receive content including potentially malicious executable code ("CODE-A"), intended for downloading at a client computer, wherein the client computer manages a plurality of computer accounts for logging in to the client computer, and wherein each computer account of the plurality of computer accounts has associated therewith a security context within which an executable running on the client computer under such account is processed;
 scan CODE-A to derive a profile thereof;
 determine, based on the derived profile of CODE-A, an appropriate computer account from among the plurality of computer accounts, under which CODE-A may be processed by the client computer;
 combine (i) information about the determined computer account name and (ii) CODE-A, with (iii) executable wrapper code ("CODE-B") into combined code ("CODE-C"); and
 forward CODE-C to the client computer for processing.

22. A method for computer security, comprising:
 downloading, by a computer, executable code ("CODE-C"), where CODE-C includes (i) wrapper executable code ("CODE-B"), (ii) potentially malicious executable code ("CODE-A"), and (iii) information about a computer account for CODE-A, wherein the computer manages a plurality of computer accounts for logging in to the computer, and wherein each computer account of the plurality of computer accounts has associated therewith a security context within which an executable running on the computer under such account is processed; and
 processing, by the computer, CODE-B, comprising:
  extracting CODE-A from within CODE-C;
  extracting the information about the computer account for CODE-A from within CODE-C; and
  processing CODE-A within the security context associated with the computer account for CODE-A.

23. The method of claim 22 further comprising:
 checking if the computer account for CODE-A exists on the computer; and
 replacing the computer account for CODE-A with a default computer account, if the computer account for CODE-A does not exist on the computer.

24. The method of claim 22 wherein said processing CODE-A includes invoking a Windows function CreateProcessAsUser() with the computer account name as an input parameter.

25. The method of claim 22 further comprising if CODE-A itself initiates executable code ("CODE-D"), then inserting CODE-D into CODE-C.

26. The method of claim 22 further comprising:
 if CODE-A itself initiates executable code ("CODE-D"), then
  scanning CODE-D to derive a profile thereof;
  determining, based on the derived profile of CODE-D, an appropriate computer account for CODE-D from among a plurality of computer accounts, under which CODE-D may be processed, wherein each computer account of the plurality of computer accounts has associated therewith a security context within which an executable is processed; and
  combining (i) information about the determined computer account name and (ii) CODE-D, with (iii) CODE-B into combined code ("Code E").

27. The method of claim 22 wherein CODE-C is signed, the method further comprising authenticating the signature of CODE-C.

28. A computer security system, comprising:
 a receiver within a computer, for downloading executable code ("CODE-C"), where CODE-C includes (i) wrapper executable code ("CODE-B"), (ii) potentially malicious executable code ("CODE-A"), and (iii) information about a computer account for CODE-A;
 an account manager within the computer, for managing a plurality of computer accounts for logging in to the computer, wherein each computer account of the plurality of computer accounts has associated therewith a security context within which an executable running on the computer under such account is processed by a processor within the computer;
 a code extractor within the computer, coupled with said receiver, for extracting CODE-A from within CODE-C;
 a computer account extractor within the computer, coupled with said receiver, for extracting the information about the computer account name for CODE-A from within CODE-C; and
 a processor within the computer, coupled with said account manager, said code extractor and said computer account extractor, for processing CODE-A within the security context associated with the computer account for CODE-A.

29. The system of claim 28 wherein said computer account extractor checks if the computer account for CODE-A exists on the computer, and replaces the computer account for CODE-A with a default computer account if the computer account for CODE-A does not exist on the computer.

30. The computer security system of claim 28 wherein said processor further comprises a code packager for inserting executable code ("CODE-D") into CODE-C if CODE-A itself initiates such executable code.

31. The computer security system of claim 28 wherein said processor further comprises:
 a code profiler for scanning executable code ("CODE-D") and deriving a profile thereof;
 a security context generator for determining, based on the profile of CODE-D derived by said code profiler, an appropriate computer account from among a plurality of computer accounts, under which CODE-D may be processed, wherein each account of the plurality of computer accounts has associated therewith a security context within which an executable is processed; and
 a code packager for packaging (i) information about the computer account name determined by said security context generator and (ii) CODE-D, with (iii) executable wrapper code ("Code B"), into a combined code ("CODE-E").

32. The computer security system of claim 28 wherein CODE-C is signed, the system further comprising a code validator for validating the signature of CODE-C.

33. A computer-readable storage medium storing program code for causing at least one computing device to:
    download executable code ("CODE-C"), where CODE-C includes (i) wrapper executable code ("CODE-B"), (ii) potentially malicious executable code ("CODE-A"), and (iii) information about a computer account for CODE-A, wherein the computer manages a plurality of computer accounts for logging in to the computer, and wherein each computer account of the plurality of computer accounts has associated therewith a security context within which an executable running on the computer under such account is processed; and
    process Code B, comprising:
        extracting CODE-A from within CODE-C;
        extracting the information about the computer account name for CODE-A from within CODE-C; and
        processing CODE-A within the security context associated with the computer account for CODE-A.

34. A method for computer security, comprising:
    receiving content including potentially malicious executable code ("CODE-A"), intended for downloading at a client computer, wherein the client computer manages a plurality of computer accounts for logging in to the client computer, and wherein each computer account of the plurality of computer accounts has associated therewith a security context within which an executable running on the client computer under such account is processed;
    receiving the name of a predetermined computer account from the plurality of computer accounts;
    scanning CODE-A to derive a profile thereof;
    combining (i) information about the predetermined computer account and (ii) CODE-A, with (iii) executable wrapper code ("CODE-B") into combined code ("CODE-C"); and
    forwarding CODE-C to the client computer for processing.

35. A computer security system for a gateway computer, comprising:
    a receiver for receiving content including potentially malicious executable code ("CODE-A"), intended for downloading at a client computer, wherein the client computer manages a plurality of computer accounts for logging in to the client computer, and wherein each computer account of the plurality of computer accounts has associated therewith a security context within which an executable running on the client computer under such account is processed;
    a code profiler, coupled with said receiver, for scanning CODE-A and deriving a profile thereof; and
    a code packager, coupled with said security context generator, for packaging (i) information about a predetermined computer account from the plurality of computer accounts, and (ii) CODE-A, with (iii) executable wrapper code ("CODE-B"), into a combined code ("CODE-C"); and
    a transmitter, coupled with said code packager, for forwarding CODE-C to the client computer for processing.

36. A computer-readable storage medium storing program code for causing at least one computing device to:
    receive content including potentially malicious executable code ("CODE-A"), intended for downloading at a client computer, wherein the client computer manages a plurality of computer accounts for logging in to the client computer, and wherein each computer account of the plurality of computer accounts has associated therewith a security context within which an executable running on the client computer under such account is processed;
    receive the name of a predetermined computer account from the plurality of computer accounts
    scan CODE-A to derive a profile thereof;
    combine (i) information about the predetermined computer account name and (ii) CODE-A, with (iii) executable wrapper code ("CODE-B") into combined code ("CODE-C"); and
    forward CODE-C to the client computer for processing.

* * * * *